United States Patent
Hayek et al.

(10) Patent No.: US 7,647,176 B2
(45) Date of Patent: Jan. 12, 2010

(54) METHOD AND SYSTEM FOR WIRELESS POWER TRANSFERS THROUGH MULTIPLE PORTS

(75) Inventors: Charles F. Hayek, Seminole, FL (US); Mark D. DuBois, Brandon, FL (US); Robert E. Johnson, Starke, FL (US)

(73) Assignee: Honeywell International Inc., Morristown, NJ (US)

( * ) Notice: Subject to any disclaimer, the term of this patent is extended or adjusted under 35 U.S.C. 154(b) by 566 days.

(21) Appl. No.: 11/622,226

(22) Filed: Jan. 11, 2007

(65) Prior Publication Data

US 2008/0172176 A1 Jul. 17, 2008

(51) Int. Cl.
*F16C 32/06* (2006.01)
*G06F 19/00* (2006.01)

(52) U.S. Cl. .................... 701/220; 701/2; 348/109

(58) Field of Classification Search ............ 701/222, 701/220, 2, 1; 384/108, 109; 714/22; 702/63
See application file for complete search history.

(56) References Cited

U.S. PATENT DOCUMENTS

| | | | |
|---|---|---|---|
| 1,315,735 A | 9/1919 | Michell | |
| 2,363,260 A | 11/1944 | Peskin | |
| 2,710,234 A | 6/1955 | Hansen | |
| 2,959,060 A | 11/1960 | Kunz | |
| 2,999,391 A | 9/1961 | Freebairn et al. | |
| 3,039,316 A | 6/1962 | Slater | |
| 3,056,303 A | 10/1962 | Naylor | |
| 3,258,977 A | 7/1966 | Hoffman | |
| 3,269,195 A | 8/1966 | Cahoon et al. | |
| 3,328,595 A | 6/1967 | Todd, Jr. | |
| 3,365,942 A | 1/1968 | Blazek | |
| 3,439,546 A | 4/1969 | Baker et al. | |
| 3,572,856 A | 3/1971 | McHugh | |

(Continued)

FOREIGN PATENT DOCUMENTS

GB 866473 4/1961

(Continued)

OTHER PUBLICATIONS

Benbasat, "An Inertial Measurement Unit for User Interfaces", Sep. 8, 2000, pp. 1-100, Publisher: Massachusetts Institute of Technology, Published in: MA, USA.

(Continued)

*Primary Examiner*—Tan Q Nguyen
(74) *Attorney, Agent, or Firm*—Fogg & Powers LLC (57) ABSTRACT

A system and method for wireless power transfer to an electronic device in motion, such as an inertial sensor assembly, is disclosed. In the method, a power level of a battery in the electronic device is monitored to determine whether the power level is at or below a prescribed threshold. One or more internal power ports of the electronic device are aligned with one or more external power ports when the power level is at or below the prescribed threshold. A wireless power signal is transmitted from the one or more external power ports to the one or more internal power ports. The power signal received by the one or more internal power ports is processed to charge the battery in the electronic device.

20 Claims, 5 Drawing Sheets

U.S. PATENT DOCUMENTS

| | | | |
|---|---|---|---|
| 3,576,124 A | 4/1971 | O'Connor |
| 3,670,585 A | 6/1972 | Alexander et al. |
| 3,769,710 A | 11/1973 | Reister |
| 3,782,167 A | 1/1974 | Stuelpnagel |
| 3,938,256 A | 2/1976 | Crocker, Jr. |
| 4,003,265 A | 1/1977 | Craig et al. |
| 4,143,466 A | 3/1979 | Quermann |
| 4,150,579 A | 4/1979 | Vaughn |
| 4,214,482 A | 7/1980 | Bouchard |
| 4,244,215 A | 1/1981 | Merhav |
| 4,290,316 A | 9/1981 | Noar et al. |
| 4,291,926 A | 9/1981 | Tomioka et al. |
| 4,413,864 A | 11/1983 | Phillips |
| 4,458,426 A | 7/1984 | O'Connor et al. |
| 4,488,041 A | 12/1984 | Baudot |
| 4,515,486 A | 5/1985 | Ide |
| 4,671,650 A | 6/1987 | Hirzel et al. |
| 4,711,125 A | 12/1987 | Morrison |
| 4,723,735 A | 2/1988 | Eisenhaure et al. |
| 4,822,181 A | 4/1989 | Egli |
| 4,917,330 A | 4/1990 | Dulat et al. |
| 5,067,084 A | 11/1991 | Kau |
| 5,088,825 A | 2/1992 | Derry et al. |
| 5,099,430 A | 3/1992 | Hirsch |
| 5,115,570 A | 5/1992 | Krogmann et al. |
| 5,319,577 A | 6/1994 | Lee |
| 5,357,437 A | 10/1994 | Polvani |
| 5,396,326 A | 3/1995 | Knobbe et al. |
| 5,410,232 A | 4/1995 | Lee |
| 5,710,559 A | 1/1998 | Krogmann |
| 5,716,142 A | 2/1998 | Kristensen et al. |
| 5,743,654 A | 4/1998 | Ide et al. |
| 5,745,869 A | 4/1998 | Van Bezooijen |
| 5,790,049 A | 8/1998 | Harrell |
| 5,894,323 A | 4/1999 | Kain et al. |
| 6,145,393 A | 11/2000 | Canton |
| 6,172,665 B1 | 1/2001 | Bullister |
| 6,481,672 B1 | 11/2002 | Goodzeit et al. |
| 6,594,623 B1 | 7/2003 | Wang et al. |
| 6,594,911 B2 | 7/2003 | Brunstein et al. |
| 6,629,778 B1 | 10/2003 | Enderle et al. |
| 6,711,952 B2 | 3/2004 | Leamy et al. |
| 6,741,209 B2 | 5/2004 | Lee |
| 6,786,084 B2 | 9/2004 | Schroeder et al. |
| 6,802,221 B2 | 10/2004 | Hedeen et al. |
| 6,826,478 B2 | 11/2004 | Riewe et al. |
| 6,918,186 B2 | 7/2005 | Ash et al. |
| 7,003,399 B1 | 2/2006 | Chappell |
| 7,066,653 B2 | 6/2006 | Dourlens et al. |
| 7,340,344 B2 | 3/2008 | Chappell |
| 7,444,210 B2 * | 10/2008 | Breed et al. ............ 701/1 |
| 2002/0077189 A1 | 6/2002 | Tuer et al. |
| 2003/0120425 A1 | 6/2003 | Stanley et al. |
| 2004/0015323 A1 | 1/2004 | Boyton |
| 2004/0075737 A1 | 4/2004 | Kirby |
| 2004/0089083 A1 | 5/2004 | Bailey |
| 2004/0098178 A1 | 5/2004 | Brady et al. |
| 2004/0212803 A1 | 10/2004 | Siegl et al. |
| 2006/0058961 A1 | 3/2006 | Chappell et al. |

FOREIGN PATENT DOCUMENTS

| | | |
|---|---|---|
| GB | 878939 | 10/1961 |
| GB | 1015681 | 1/1966 |
| GB | 1284195 | 8/1972 |
| GB | 2166920 | 5/1986 |
| WO | 9505547 | 2/1995 |
| WO | 2004023150 | 3/2004 |
| WO | 2006060715 | 6/2006 |

OTHER PUBLICATIONS

El-Sheimy et al., "Structural Monitoring Using Wirelessly Connected MEMS-Based Sensors: Towards System Development", Feb. 18, 2003, pp. 1-10, Publisher: ICPCM, Published in: Cairo, Egypt.

IBM Corp., "The Tracking Cube: A Three Dimensional Input Device", Aug. 1, 1989, pp. 91-95, vol. 32, No. 3B, Publisher: IBM Technical Disclosure Bulletin, Published in: NY, US.

NG, "The Optical Mouse as a Two-Dimensional Displacement Sensor", Sensors and Actuators A, Oct. 1, 2003, pp. 21-25, vol. 107, No. 1, Publisher: Elseveier Sequoia S.A., Published in: Lausanne, CH.

* cited by examiner

METHOD AND SYSTEM FOR WIRELESS POWER TRANSFERS THROUGH MULTIPLE PORTS

RELATED APPLICATIONS

This application is related to commonly assigned U.S. patent application Ser. No. 11/004,184, filed on Dec. 3, 2004 and entitled "GAS SUPPORTED INERTIAL SENSOR SYSTEM AND METHOD" (the '184 Application). The '184 Application is incorporated herein by reference.

This application is also related to the following commonly assigned applications filed on Dec. 3, 2004, each of which is incorporated herein by reference:

U.S. patent application Ser. No. 11/004,177, entitled "RF WIRELESS COMMUNICATION FOR DEEPLY EMBEDDED AEROSPACE SYSTEMS" (the '177 Application).

U.S. patent application Ser. No. 11/004,531, entitled "SPHERICAL POSITION MONITORING SYSTEM" (the '531 Application).

BACKGROUND

Precision inertial navigation systems are used in civil and military aviation, missiles and other projectiles, submarines and space technology as well as in numerous other craft applications. A typical intertial navigation system (INS) measures the position and attitude of a vehicle by measuring the accelerations and rotations applied to the vehicle's inertial frame of reference. Since the typical INS is not dependent on other points of reference, it is resistant to jamming and deception.

The typical INS requires concentric sets of ball bearing supported gimbals that allow instruments to freely rotate in flight maneuvers and further allow for manipulation during a calibration routine. A typical inertial sensor assembly (ISA) within the INS is an electronic device that contains internally embedded instrumentation (e.g., one or more accelerometers and gyroscopes) that communicates with other vehicle systems. Data from the internally embedded instrumentation is typically communicated to the other vehicle systems through moving contact devices, such as slip rings or twist caps. The slip rings and twist caps provide a constant communication link for the data without restricting the movement of the ISA.

However, the slip rings and twist caps (along with the ball bearing supported gimbals) are moving physical structures subject to wear. Multiple slip rings and twist caps represent potential failure points for the typical INS. Similarly, transferring supply power to the ISA through the multiple slip rings and twist caps is subject to interference due to electrical noise. Moreover, receiving the supply power through the moving contact devices is restricted in applications where the gimbals are absent and physical contact with the ISA is prohibited.

SUMMARY

The present invention relates to a system and method for wireless power transfer to an electronic device in motion, such as an inertial sensor assembly used in an inertial navigation system. In the method, a power level of a battery in the electronic device is monitored to determine whether the power level is at or below a prescribed threshold. One or more internal power ports of the electronic device are aligned with one or more external power ports when the power level is at or below the prescribed threshold. A wireless power signal is transmitted from the one or more external power ports to the one or more internal power ports. The power signal received by the one or more internal power ports is processed to charge the battery in the electronic device.

BRIEF DESCRIPTION OF THE DRAWINGS

Features of the present invention will become apparent to those skilled in the art from the following description with reference to the drawings. Understanding that the drawings depict only typical embodiments of the invention and are not therefore to be considered limiting in scope, the invention will be described with additional specificity and detail through the use of the accompanying drawings, in which.

DETAILED DESCRIPTION

The present invention is directed to a method and system for wireless transfer of power to an electronic device that is in motion, such as an inertial sensor assembly (ISA) used in an intertial navigation system (INS). The ISA can include a hollow sphere suspended by air bearings and containing internal guidance and navigation electronics. A switching power supply is used to transfer a power signal across an air gap in a contactless fashion to power the internal electronics and charge a battery in the ISA.

In one embodiment, the switching power supply includes primary electronics and a first wound magnetic material, which is inductively coupled to a second wound magnetic material connected to secondary electronics in the ISA. The first and second wound magnetic materials are precision machined, with one being concave and the other being convex. This allows power to be transferred in a wireless fashion into the ISA. Further details of the present invention are discussed as follows with respect to the drawings.

Figure 1:
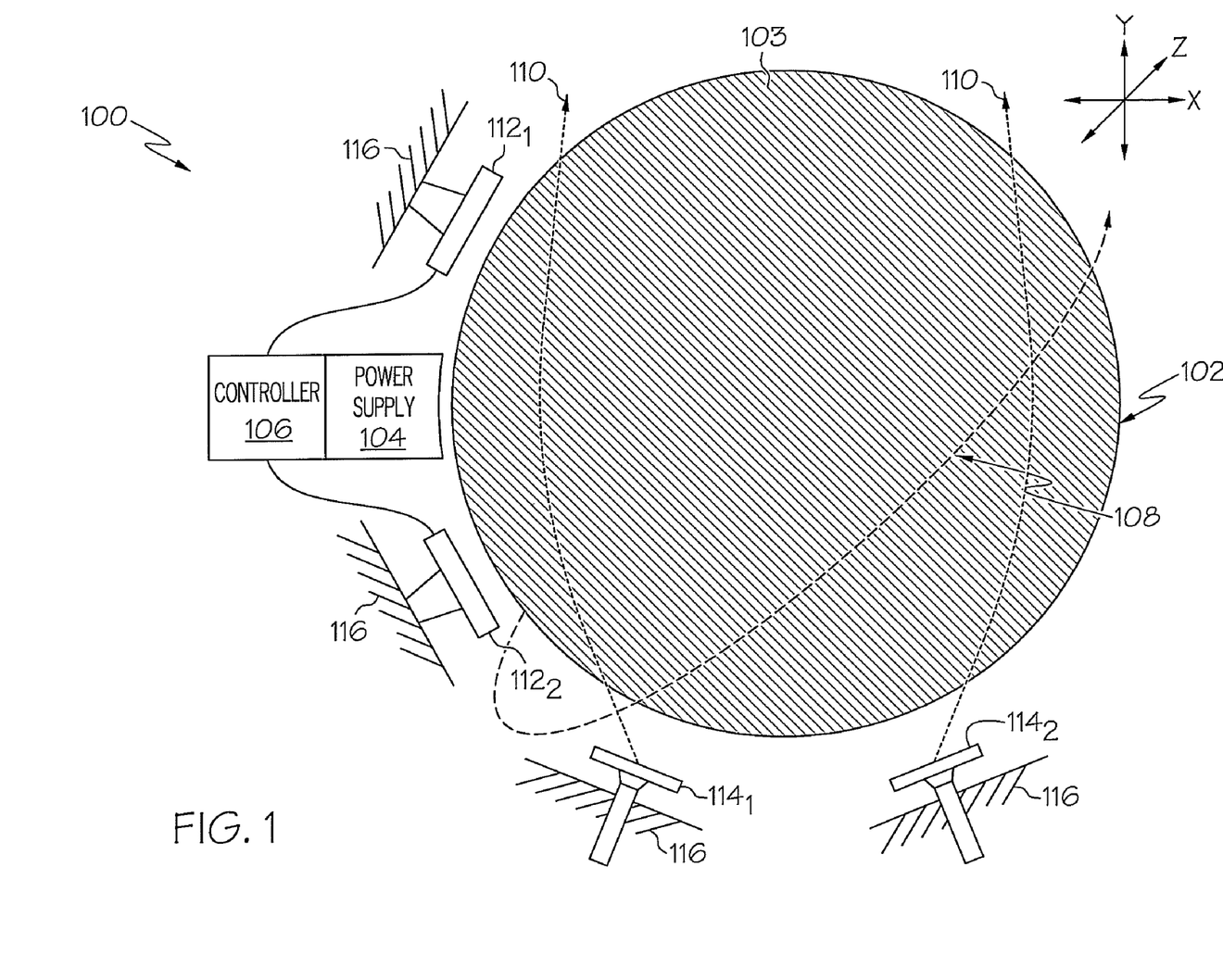
FIG. 1 is a schematic diagram of an embodiment of an inertial navigation system.

FIG. 1 is a schematic diagram of an embodiment of an INS 100. The INS 100 comprises at least one inertial sensor assembly (ISA) 102, a power supply 104, and a controller 106 responsive to the ISA 102 and the power supply 104. The ISA 102 can include a hollow sphere 103 supported within a spherically shaped gas bearing 110 generated by gas insertion pads $114_1$ and $114_2$ which are attached to an outer shell assembly 116. The hollow sphere 103 can be made from a metallic material such as aluminum.

Although only two gas insertion pads $114_1$ and $114_2$ are shown in FIG. 1, it should be understood that two or more gas insertion pads are suitable for use in generating the gas bearing 110. A pressurized gas is released from the gas insertion pads $114_1$ and $114_2$ to support the ISA 102 in the gas bearing 110 with no contact between the ISA 102 and the gas insertion pads 114. The gas bearing 110 allows the ISA 102 to rotate on all three axes as indicated in FIG. 1. In the example embodiment of FIG. 1, the reference number 108 illustrates an example of a rotational motion of the ISA 102.

In one implementation, the INS 100 comprises a spherical position monitoring system as discussed in further detail with respect to the '531 Application. The INS 100 further comprises positioning sensors $112_1$ and $112_2$ that are coupled to respective fixed reference positions along the outer shell assembly 116. It should be understood that the INS 100 is capable of accommodating any appropriate number of positioning sensors (e.g., one or more positioning sensors 112) in a single INS 100. The positioning sensors and controller provide means for aligning one or more internal power ports of the electronic device with one or more external power ports when the power level is at or below a prescribed threshold. The internal and external power ports are discussed in further detail hereafter.

In one implementation, the positioning sensors $112_1$ and $112_2$ can be optical sensors aimed at an outer surface of the ISA 102. As further disclosed in the '531 Application, the ISA 102 comprises a coordinate-encoded pattern applied to the outer surface. The positioning sensors 112 capture one or more pattern images of the coordinate-encoded pattern on the outer surface. The positioning sensors 112 communicate the one or more pattern images to the controller 106. The controller 106 analyzes the one or more pattern images to decode the position coordinates of the ISA 102 currently in view of the positioning sensors 112. The controller 106 calculates the angular position of the ISA 102 based on the position coordinates. Additional details regarding the gas bearing 110, the positioning sensors 112, the gas pads 114, and the ISA 102 are disclosed in the '184 Application.

In operation, the ISA 102 will remain in motion (i.e., controlled movement) until a battery such as a battery bank inside the ISA 102 requires additional electrical charge. When the battery requires additional charge, the ISA 102 notifies the controller 106 to align an external power port with an internal power port of the ISA 102 (discussed in further detail with respect to FIG. 2 below) using the positioning sensors 112. The power supply 104 aligns with one or more internal power ports to transfer wireless power signals from the power supply 104 to the ISA 102.

The INS 100 eliminates the need for gimbals and ball bearings by supporting the ISA 102 with the gas bearing 110. As such, the gas bearing 110 eliminates physical reference points provided by gimbals. Since external physical contact with the freely rotating ISA 102 is prohibited, embedded sensor instrumentation in the ISA 102 is powered by positioning the ISA 102 to charge the battery without external physical contact with the power supply 104. Alternatively, the gas bearing can be provided by one or more of the external power ports.

Figure 2:
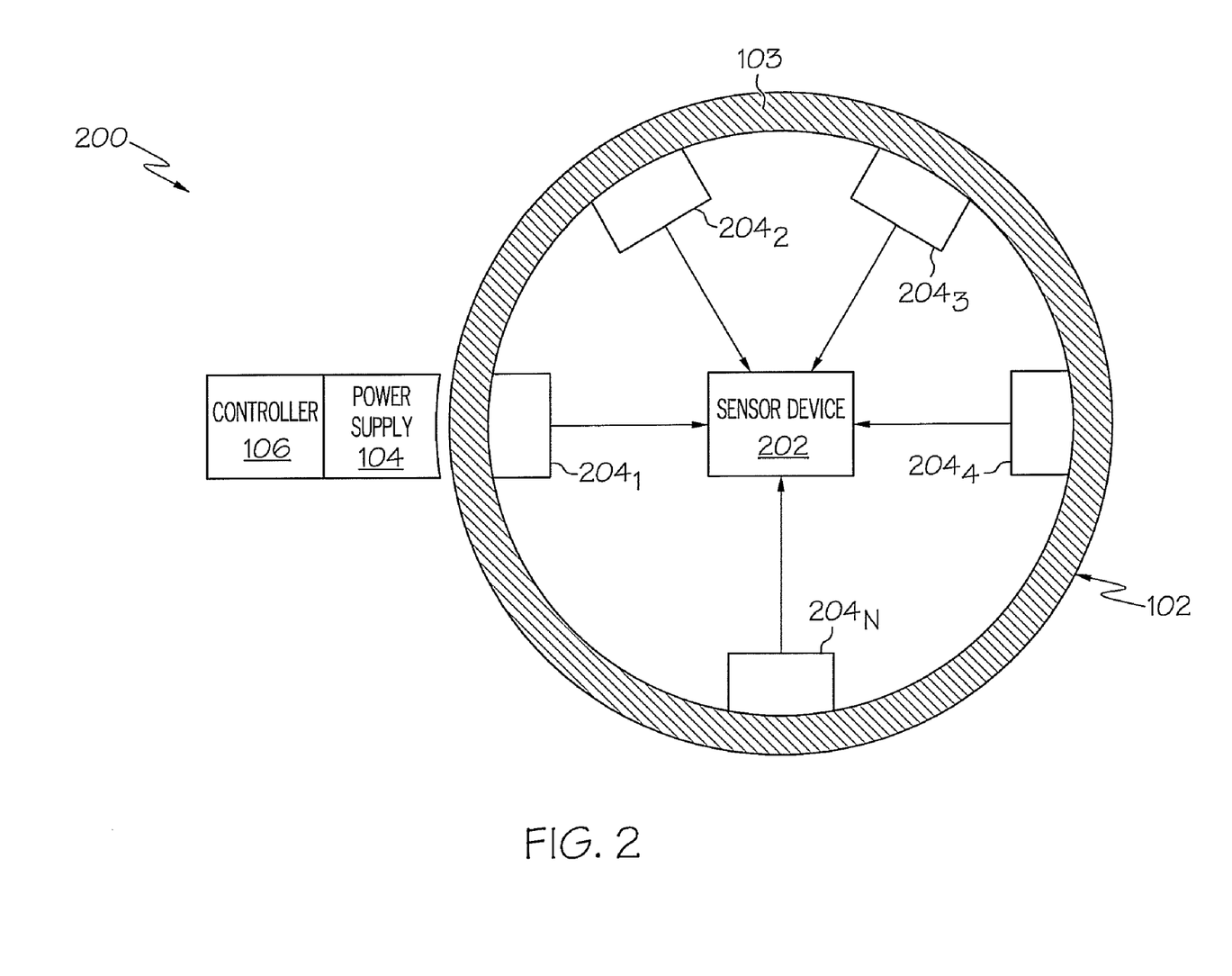
FIG. 2 is a schematic diagram of an embodiment of an inertial navigation system with multiple power ports.

FIG. 2 depicts an embodiment of an INS 200 comprising multiple internal power ports. The INS 200 comprises an ISA 102, a power supply 104, and a controller 106 as shown FIG. 1. Within the ISA 102 is a sensor device 202 and internal power ports $204_1$ to $204_N$ (i.e., multiple power ports) coupled to the sensor device 202. It is understood that the ISA 102 of FIG. 2 is capable of accommodating any appropriate number of the internal power ports $204_1$ to $204_N$ (e.g., one or more internal power ports 204) in a single ISA 102. The power supply 104 includes one or more external power ports (discussed in further detail below with respect to FIG. 3) that align with one or more internal power ports $204_1$ to $204_N$ to transfer wireless power signals. In one implementation, each of the internal power ports $204_1$ to $204_N$ comprises convex secondary cores that can be aligned with a concave primary core of the external power port.

The internal power ports can be aligned with the external power port by using the positioning optical sensors described previously, or by using inertial data from gyroscopes and accelerometers in the ISA 102. Optionally, the optical sensors and inertial data can be used in combination to align the ports.

Embedded instrumentation within the sensor device 202 includes, but is not limited to, one or more gyroscopes, angular accelerometers, velocity meters, and other inertial sensors. The sensor device 202 communicates sensor data from the embedded instrumentation to the controller 106, which is further described in the '177 Application. The sensor data includes, but is not limited to, data collected from the outputs of the embedded instrumentation, system health indicators and alarms (for example, battery power level and component failure indications in the ISA 102), and programming and control instructions for electronic components within the embedded instrumentation of the sensor device 202.

In operation, the power supply 104 transfers power to the ISA 102 through one or more wireless power ports. The controller 106 aligns one or more of the internal power ports 204 with one or more external power ports. As discussed in further detail below with respect to FIG. 3, the controller 106 positions a secondary core of each of the internal power ports 204 with a stationary primary core of the power supply 104 so that the ports have a separation distance (air gap) of about 0.001 inch (0.0254 mm) or less. One or more of the internal power ports 204 receive a power signal from the power supply 104, which passes the power signal through the gas bearing 110 that supports the motion of the ISA 102.

The sensor device 202 can combine a plurality of power signals from each of the internal power ports 204 to serve the embedded instrumentation (i.e., an electrical load) in parallel with a battery bank within the sensor device 202. As further discussed below with respect to FIG. 3, the sensor device 202 includes a battery monitor that indicates to the power supply 104 (via the controller 106) that a charge level in the battery bank is approaching a prescribed threshold level. As the battery bank requires additional charge, the ISA 102 can suspend motion around two axes of rotation while maintaining motion around one axis of rotation until the battery is sufficiently charged.

Figure 3:
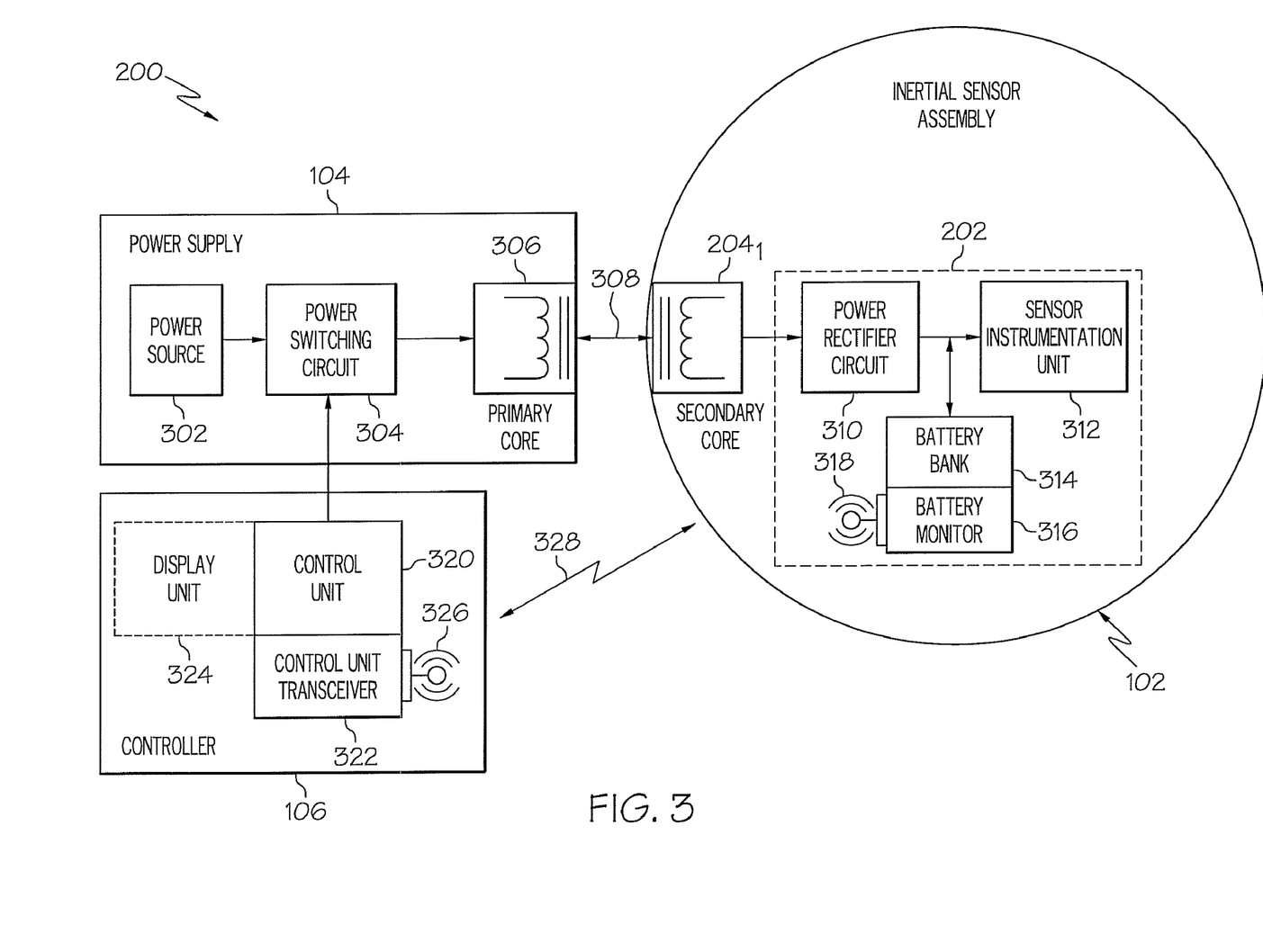
FIG. 3 is a schematic diagram showing further details of the inertial navigation system of FIG. 2.

FIG. 3 is a schematic diagram showing further details of the INS 200. As shown, the power supply 104 includes a power source 302 that provides one or more levels of electrical power, a power switching circuit 304 responsive to the controller 106 and the power source 302, and at least one external power port 306. Although a single external power port 306 is depicted in FIG. 3, it should be understood that one or more additional external power ports can be implemented in INS 200.

The external power port 306 can include a concave or convex primary core that is configured to respectively align with a corresponding convex or concave secondary core of each of the internal power ports $204_1$ to $204_N$ to form one or more wireless power ports (as discussed above with respect to FIG. 2). The primary and secondary cores provide a means for transmitting a wireless power signal from the one or more external power ports to the internal power ports.

As shown in FIG. 3, an external power port 306 aligns with an internal power port $204_1$, separated by an air gap 308, to complete a wireless power transfer. The internal and external power ports can include wound magnetic materials such as ferrite materials, and act as coupled inductors to transfer power. In an exemplary implementation, each of the secondary cores can be aligned with the primary core so as to have a separation distance of about 0.001 inch (0.0254 mm) or less.

The sensor device 202 provides a means for processing the power signal received by the one or more internal power ports to charge a battery bank 314. The sensor device 202 includes a power rectifier circuit 310 responsive to each of the internal power ports. A sensor instrumentation unit 312 is connected in parallel with the battery bank 314. Both the sensor instrumentation unit 312 and the battery bank 314 are responsive to one or more rectified power signals from the power rectifier circuit 310 when at least one of the internal power ports (e.g., internal power port $204_1$) aligns with an external power port 306. In one implementation, the battery bank 314 further comprises a battery monitor 316 and an ISA antenna 318.

The controller 106 further comprises a control unit 320 responsive to a control unit transceiver 322 and a control unit transceiver antenna 326. In one implementation, the controller 106 can include a display unit 324 that indicates a current power status of the ISA 102.

The battery monitor 316 provides a means for determining if a power level is at or below a predetermined threshold for the battery bank 314. The battery monitor 316 communicates a charge level of the battery bank 314 to the controller 106 via a wireless connection 328 between the ISA antenna 318 and the control unit transceiver antenna 326.

In operation, the wireless power transfer begins when the power switching circuit 304 energizes one or more external power ports 306 as directed by the control unit 320. The power switching circuit 304 steps up (or steps down) one or more voltage levels from the power source 302 to the ISA 102. As indicated above with respect to FIG. 1, the controller 106 positions the ISA 102 to receive each of the one or more voltage levels from the power source 302 through the one or more external power ports 306. The power supply 104 transfers each of the electrical charges without a physically contacting electrical connection through the air gap 308 into one or more of a plurality of convex secondary cores (e.g., the internal power ports 204) in the ISA 102.

In the example embodiment of FIG. 3, the sensor device 202 receives the one or more voltage levels from the internal power port $204_1$. In the same and alternate embodiments, each of the internal power ports $204_1$ to $204_N$ pass the one or more voltage levels to the sensor device 202. The one or more (combined) voltage levels are rectified in the power rectifier circuit 310. The one or more rectified voltage levels power the embedded instrumentation of the sensor instrumentation unit 312 and the battery bank 314. In one implementation, the sensor instrumentation unit 312 and the battery bank 314 are connected in parallel to the power rectifier circuit 310 and receive substantially the same one or more rectified voltage levels at substantially the same time. The power from all power ports can be diode ORed together and applied across the load-battery parallel combination.

As the battery bank 314 is charging, the battery monitor 316 communicates a battery charge level in the battery bank 314 to the controller 106. In one implementation, the controller 106 provides an indication of the battery charge level to the (optional) display unit 324. The battery monitor 316 continues to report the battery charge level to the control unit transceiver 322 over the wireless connection 328. As the battery charge level approaches a prescribed threshold level, the controller 106 will reposition the ISA 102 to receive additional charging from the power supply 104 as described above.

Figure 4:
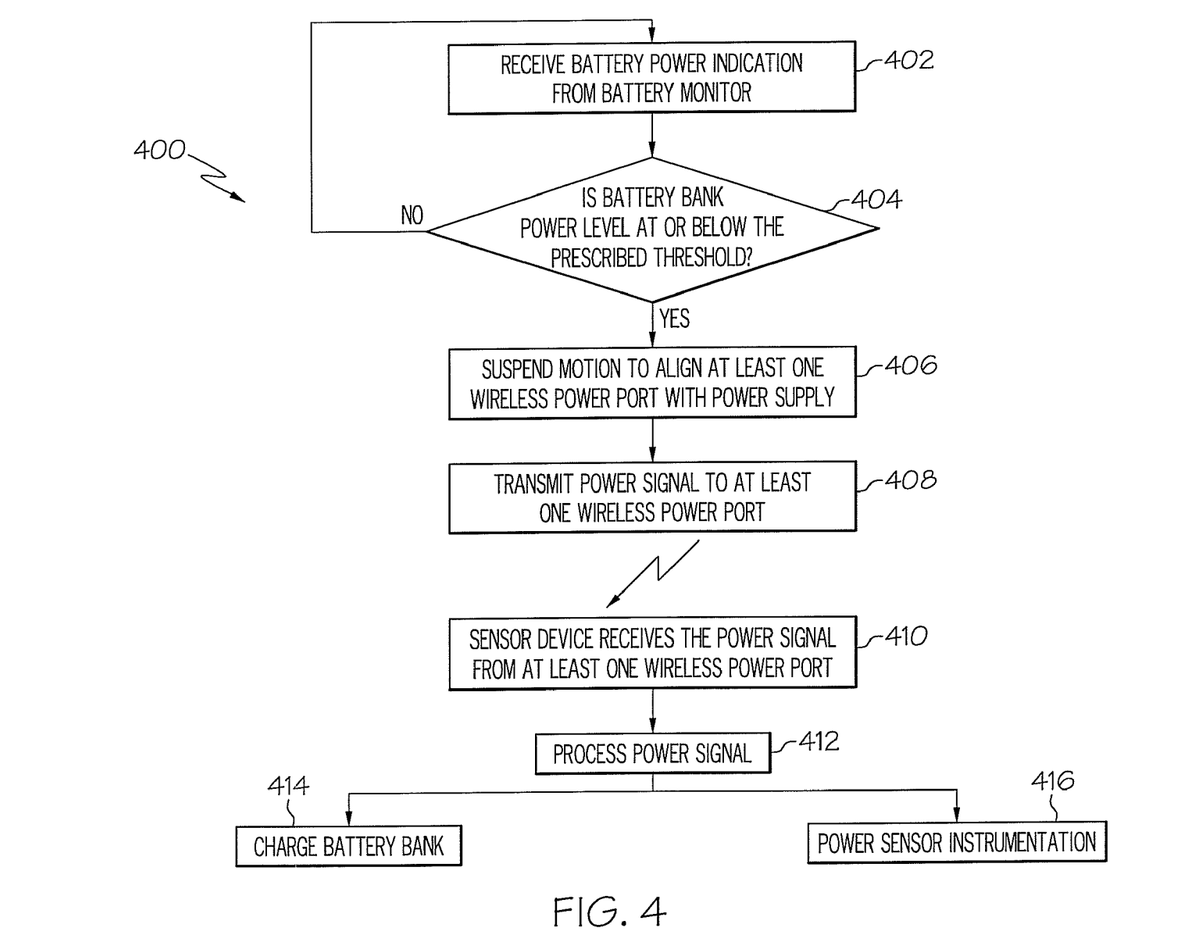
FIG. 4 is a flow diagram illustrating a method for wireless power transfer in an inertial navigation system.

FIG. 4 is a flow diagram illustrating an exemplary method 400 for wireless transfer of power such as in INS 200. Initially, the controller 106 receives an indication of battery power from the battery monitor 316 (block 402). If the controller 106 determines that the power level of the battery bank 314 is at or below a prescribed threshold (block 404), one or more wireless internal power ports (e.g., internal power port $204_1$) is aligned with one or more external power ports 306 of the power supply 104 (block 406). The one or more external power ports 306 then transmit a power signal to at least one of the wireless internal power ports (block 408). The sensor device 202 receives the power signal from at least one of the wireless internal power ports (block 410), and processes the power signal (block 412). The sensor device 202 charges the battery bank 314 (block 414) and powers embedded instrumentation in the sensor instrumentation unit 312 (block 416) at substantially the same time. Once the battery bank 314 reaches a prescribed charging level, the sensor instrumentation unit 312 is powered from the battery bank 314.

Figure 5:
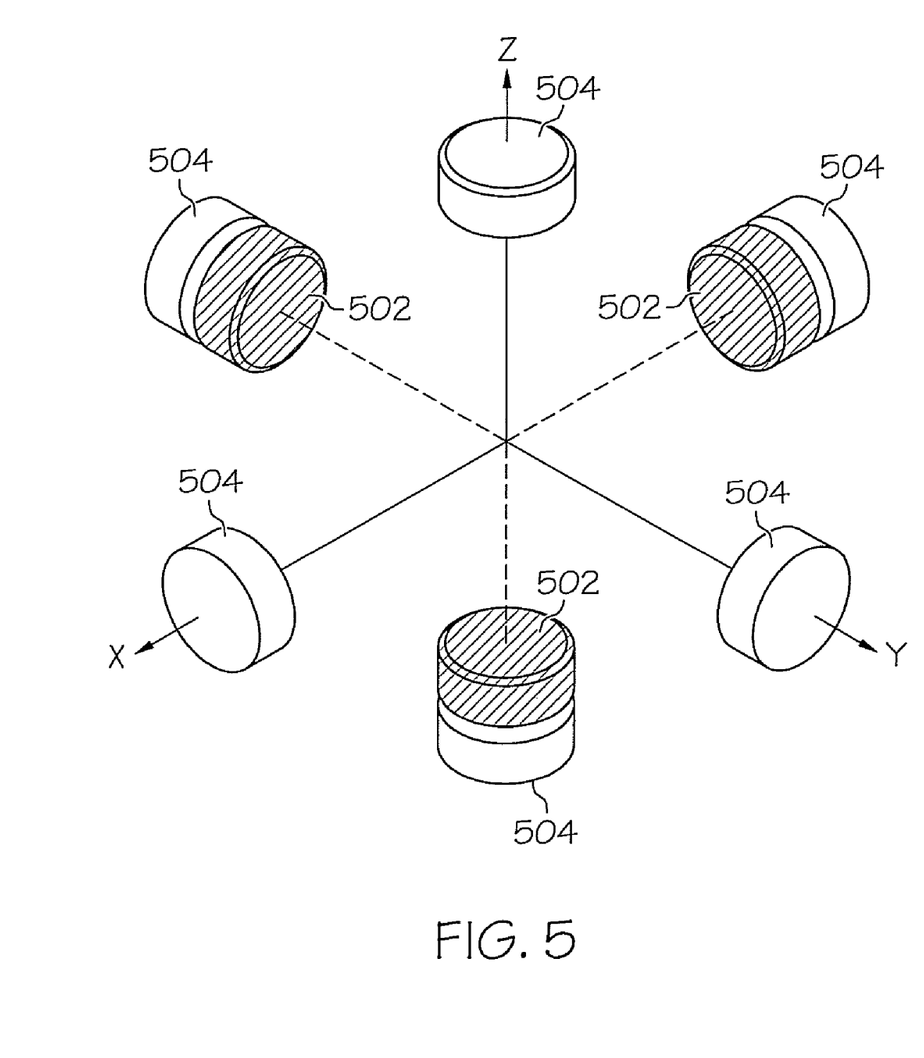
FIG. 5 is a schematic diagram illustrating another method for wireless power transfer in an inertial navigation system.

FIG. 5 illustrates another mode of operation for wireless power transfer to a sensor sphere with a battery back-up such as sensor device 202. Inductive coupling provides power during the majority of the operating time of the sensor sphere, with the batteries used for motion between charging sites and during a flight operation. For example, three orthogonal internal magnetic cores 502, such as ferrite cup pick-up coils in the sensor sphere, can be aligned with any one of six external magnetic cores 504, such as transmission coils placed on the principal axes (x, y, z), as shown in FIG. 5. This allows power transfer to occur during rotation of the sensor sphere around any principal axis during calibration.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A method for wireless power transfer to an electronic device in motion, the method comprising:
    monitoring a power level of a battery in the electronic device to determine whether the power level is at or below a prescribed threshold;
    aligning one or more internal power ports of the electronic device with one or more external power ports when the power level is at or below the prescribed threshold;
    transmitting a wireless power signal from the one or more external power ports to the one or more internal power ports; and
    processing the power signal received by the one or more internal power ports to charge the battery in the electronic device.

2. The method of claim 1, wherein the motion of the electronic device is suspended around two axes of rotation while maintaining motion around one axis of rotation until the battery is sufficiently charged.

3. The method of claim 1, wherein the one or more internal power ports are aligned with the one or more external power ports so that a secondary core of an internal power port has a separation distance from a primary core of an external power port of about 0.001 inch or less.

4. The method of claim 1, further comprising serving an electrical load in the electronic device while the battery is being charged.

5. The method of claim 1, wherein the electronic device comprises an inertial sensor assembly.

6. An electronic system, comprising:
    at least one inertial sensor assembly, comprising:
        one or more internal power ports; and
        a sensor device responsive to the one or more internal power ports;
    a power supply in communication with the inertial sensor assembly, the power supply comprising:
        one or more external power ports that are configured to align with the one or more internal power ports to transfer wireless power signals; and a power source in communication with the one or more external power ports for providing one or more levels of electrical power; and a controller in communication with the inertial sensor assembly and the power supply, the controller configured to notify the power supply when the inertial sensor assembly needs to be electrically charged.

7. The system of claim 6, further comprising:

at least two positioning sensors responsive to the controller, the positioning sensors configured to align the one or more internal power ports with the one or more external power ports; and at least two gas insertion pads that maintain a constant gas-pressurized bearing to provide for rotation of the inertial sensor assembly without physical contact with the power supply and the controller.

8. The system of claim 6, wherein the inertial sensor assembly comprises a hollow sphere.

9. The system of claim 6, wherein the power supply further comprises:

a power switching circuit responsive to the controller and the power source;

wherein the power switching circuit energizes the one or more external power ports as directed by the controller.

10. The system of claim 6, wherein the one or more external power ports comprise one or more primary cores that are concave or convex.

11. The system of claim 10, wherein the one or more primary cores comprise a wound magnetic material.

12. The system of claim 10, wherein the one or more internal power ports comprise one or more secondary cores that are convex when the one or more external power ports are concave.

13. The system of claim 12, wherein the secondary core comprises a wound magnetic material.

14. The system of claim 12, wherein when one of the internal power ports is aligned with one of the external power ports, a secondary core has a separation distance from a primary core of about 0.001 inch or less.

15. The system of claim 6, wherein the sensor device further comprises:

a power rectifier circuit responsive to the one or more internal power ports;

a battery bank responsive to one or more power signals from the power rectifier circuit; and a sensor instrumentation unit in communication with the power rectifier circuit and the battery bank.

16. The system of claim 15, further comprising a battery monitor that is configured to communicate a battery bank charge level to the controller.

17. The system of claim 6, wherein the controller further comprises:

a control unit in communication with the power supply;

a control unit transceiver responsive to the sensor device and in communication with the control unit; and an optional display unit that indicates a power status of the sensor device.

18. A system for wireless power transfer to an electronic device in motion, the system comprising:

means for determining if a power level is at or below a predetermined threshold for a battery in the electronic device;

means for aligning one or more internal power ports of the electronic device with one or more external power ports when the power level is at or below the prescribed threshold;

means for transmitting a wireless power signal from the one or more external power ports to the one or more internal power ports; and means for processing the power signal received by the one or more internal power ports to charge the battery in the electronic device.

19. The system of claim 18, wherein the electronic device comprises an inertial sensor assembly.

20. The system of claim 18, wherein the one or more external power ports comprises a primary core that is concave, and wherein the one or more internal power ports comprises a secondary core that is convex.

* * * * *